United States Patent
Figueroa

(10) Patent No.: US 9,010,550 B2
(45) Date of Patent: Apr. 21, 2015

(54) UNDER-HOOD TOOL BAR

(71) Applicant: Manuel Antonio Figueroa, Everett, WA (US)

(72) Inventor: Manuel Antonio Figueroa, Everett, WA (US)

( * ) Notice: Subject to any disclaimer, the term of this patent is extended or adjusted under 35 U.S.C. 154(b) by 147 days.

(21) Appl. No.: 13/744,132

(22) Filed: Jan. 17, 2013

(65) Prior Publication Data

US 2014/0197292 A1     Jul. 17, 2014

(51) Int. Cl.
| | |
|---|---|
| A47F 7/00 | (2006.01) |
| B60R 9/00 | (2006.01) |
| F16M 13/02 | (2006.01) |
| B25H 1/00 | (2006.01) |
| B25H 3/00 | (2006.01) |

(52) U.S. Cl.
CPC ............... F16M 13/022 (2013.01); B25H 1/00 (2013.01); B25H 3/00 (2013.01)

(58) Field of Classification Search
USPC ............... 248/227.1, 644, 200.1, 354.1, 503; 224/405, 550, 551, 556, 580, 493, 585, 224/309, 563, 572; 293/142; 211/70.6, 211/105.1, 105.3, 123; 362/486; 108/44
See application file for complete search history.

(56) References Cited

U.S. PATENT DOCUMENTS

| | | | |
|---|---|---|---|
| 4,136,904 A | 1/1979 | Lauderdale | |
| 4,179,153 A | 12/1979 | Cole, Jr. | |
| 4,197,573 A * | 4/1980 | Thatch | 362/241 |
| 4,660,880 A | 4/1987 | Bensch | |
| 4,828,303 A * | 5/1989 | Soria | 293/128 |
| 5,685,468 A | 11/1997 | Hernandez et al. | |
| 5,743,394 A * | 4/1998 | Martin | 206/378 |
| 7,401,940 B2 * | 7/2008 | Min | 362/191 |
| 7,802,680 B2 * | 9/2010 | Krebs et al. | 206/349 |
| 8,733,605 B2 * | 5/2014 | Pedrini | 224/488 |
| 2004/0085761 A1 * | 5/2004 | Offiler et al. | 362/217 |
| 2008/0254708 A1 | 10/2008 | Amadio et al. | |
| 2009/0303739 A1 * | 12/2009 | Garcia | 362/496 |
| 2011/0099795 A1 | 5/2011 | Skluzak et al. | |
| 2011/0290839 A1 * | 12/2011 | Pedrini | 224/533 |
| 2012/0182749 A1 * | 7/2012 | MacGregor | 362/486 |
| 2013/0200020 A1 * | 8/2013 | Wollert | 211/70.6 |

FOREIGN PATENT DOCUMENTS

| | | |
|---|---|---|
| GB | 242449 | 11/1925 |
| GB | 459085 | 1/1937 |

OTHER PUBLICATIONS

Central Tools, Under Hood Light and LightPerch Combo, Amazon.com, 2012, United States.
Light Up the Hood, The Family Handyman, 2012, United States.

* cited by examiner

*Primary Examiner* — Christopher Garft
(74) *Attorney, Agent, or Firm* — Lowe Graham Jones PLLC

(57) ABSTRACT

A tool bar for securing under a hood of a car during repair and maintenance is disclosed. A rigid member spanning a substantial portion of the hood is flexibly secured to hooks. The hooks engage edges of the hood and may include a compliant covering. The hooks may secure to the rigid member by means of straps and the straps may be tensioned by means of tensioners secured to one of the hooks and the rigid member. A stabilizer secures to the rigid member and has an end that may be clipped or otherwise fastened to a portion of the hood to resist rotation of the rigid member. One or more tool retaining members secured to the rigid member, such as a socket rack, magnetic bar, hook groove, or the like.

12 Claims, 6 Drawing Sheets

UNDER-HOOD TOOL BAR

FIELD OF THE INVENTION

This application relates to tool holding apparatuses and methods.

BACKGROUND OF THE INVENTION

When performing repair and maintenance on an automobile, many tools may be required. Many options exist for storing and organizing tools, such as the conventional multi-drawer tool chest or a wall-mounted tool hooks. However, in a large garage or for complex tasks, it can be time consuming to go back and forth to tool storage each time a new tool is needed. Placing tools on the car itself is problematic inasmuch as hard metal tools can make dents or chips even if a cloth is placed under the tools. Placing tools on the engine or elsewhere in the engine compartment is even worse, inasmuch as tools can fall into the engine compartment and be difficult to retrieve or can be dangerous if left behind. A tool belt, such as may be used in other professions, is also impractical inasmuch as the belt and the tools in it are likely to damage the panels of a car when the mechanic leans over the engine compartment.

Accordingly, it would be an advancement in the art to provide an improved means for providing access to a mechanic's tools when working in the engine compartment of an automobile.

SUMMARY OF THE INVENTION

In one aspect of the invention, an apparatus for storing tools under a hood of an automobile is disclosed. The apparatus includes a rigid portion sized to span a major portion of the hood along at least one direction. A first hook is flexibly secured to a first end portion of the rigid portion and is positioned to receive to a first edge of the hood. A second hook is flexibly secured to a second end portion of the rigid member and is positioned to receive a second edge of the hood such that a portion of the hood is captured between the first and second hooks.

At least one temporary tool retaining member is mounted to the rigid portion. The temporary tool retaining member may, for example, include a magnetic bar, socket rack, hook, or the like.

The first and second hooks may have a compliant outer covering and may be flexibly secured to the rigid member by means of straps. The straps may be affixed to either the hooks or the rigid member. The straps may be secured to the other of the hooks or the rigid member by means of a tensioner mounted thereto. The tensioner may have a first position that allows tensioning of a strap and resists loosening and a second position that allows movement of the strap therethrough regardless of direction.

A stabilizer may include a first portion secured to the rigid member and a second portion having a fastener for securement to the hood in a manner effective to resist rotation of the rigid member. As an example, the fastener may be secured to a striker of the hood latch. The stabilizer may be a cable or strap and the extent of the cable or strap between the rigid member and the fastener may be adjustable.

BRIEF DESCRIPTION OF THE DRAWINGS

Preferred and alternative examples of the present invention are described in detail below with reference to the following drawings.

DETAILED DESCRIPTION OF THE PREFERRED EMBODIMENT

Figure 1A:
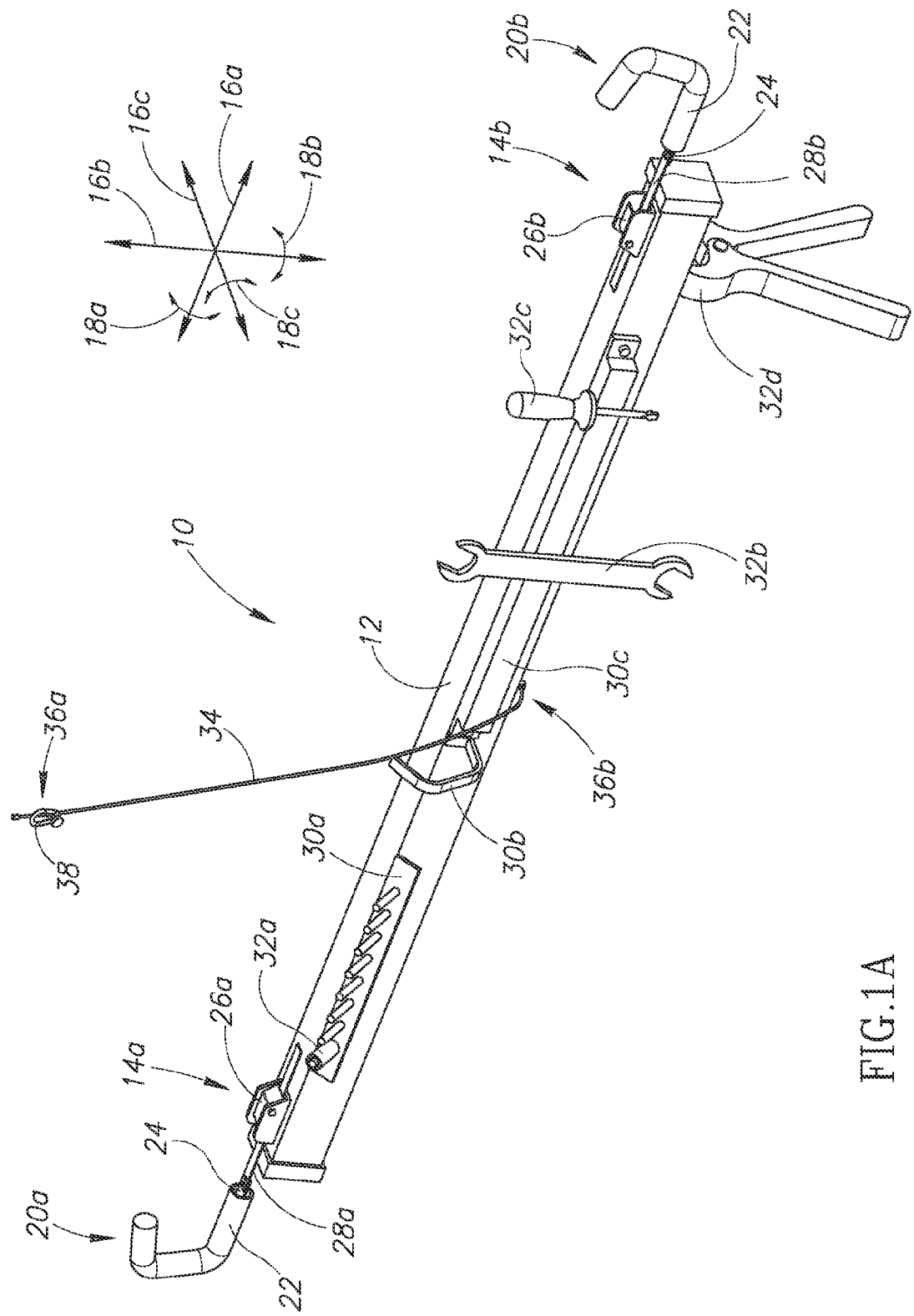
FIG. 1A is an isometric view of a tool holding system in accordance with an embodiment of the present invention.

FIG. 1A illustrates a tool holding system 10 suitable for use, for example, under the hood of an automobile. The tool holding system 10 may be used in any situation where opposing edges of structures are available for mounting of the tool holding system 10 as will be described in detail below. The tool holding system 10 may advantageously be used to hold tools for use in performing repairs or maintenance on an automobile. The tool holding system 10 may include a rigid member 12 having an end portion 14a and an end portion 14b opposite the end portion 14a. The end portions 14a, 14b may be separated along a line parallel to a lateral direction 16a extending therebetwen. A vertical direction 16b may be defined that is orthogonal to the lateral direction 16a and a longitudinal direction 16c may be defined that is orthogonal to both the lateral direction 16a and vertical direction 16b. In addition, a rotational direction 18a may be defined as rotation about the lateral axis 16a, a rotational direction 18b may be defined as rotation about the vertical direction 16b, and a rotational direction 18c may be defined as rotation about the longitudinal direction 16c.

In the illustrated embodiment, the rigid member 12 is embodied as a bar or rod having substantially constant cross section and sized to extend across a major portion, or substantially all, but preferably less than the entirety, of the width of an automobile hood. Other shapes and configurations of the rigid member 12 may also be used. The rigid member 12 may be solid or hollow and may define an enclosed central space or define an opening along the length thereof. In use, the rigid member may be oriented having the long dimension generally parallel to the lateral direction 16a, however other modes of use are also possible. The rigid member 12 may be formed of any rigid material such as metal, rigid plastic, wood, fiberglass, carbon fiber, or other material. Some flex of the rigid member 12 may be present in use, provided tools are retained well away from the engine compartment. For example, the rigid member 12 may be sufficiently rigid to sag less than 5% of its length due to its own weight when supported at the ends thereof.

The rigid member 12 is flexibly secured to one or more hooks 20a, 20b. In a preferred embodiment, the rigid member is flexibly mounted to two hooks 20a, 20b. For example, the hooks 20a, 20b may flexibly secure to the end portions 14a, 14b, respectively, of the rigid portion 12. The hooks 20a, 20b may be formed of a compliant yet rigid material that is suitable for retaining the shape of the hooks sufficiently to maintain the functionality of the hooks 20a, 20b as hooks and yet compliant enough not to damage paint of an automobile hood. In the illustrated embodiments, the hooks 20a, 20b include a compliant covering 22 fitted over a rigid member 24a shaped as a hook made of metal, rigid plastic, or composite material. For example, the compliant covering 22 may be foam, rubber, or any other compliant polymer. The hooks 20a, 20b may define any shape sufficient to engage an edge of an automobile hood and resist removal or deformation despite of tension applied inwardly toward the center of the hood upon the hooks 20a, 20b.

In the illustrated embodiment, flexible securement of the hooks 20a, 20b to the rigid member 12 may be accomplished by means of tensioners 26a, 26b engaging straps 28a, 28b, respectively. The tensioners 26a, 26b may be affixed to the end portions 14a, 14b, respectively, of the rigid member 12 and the straps 28a, 28b may be secured to the hooks 20a, 20b. Alternatively, the tensioners 26a, 26b may be secured to the hooks 20a, 20b and the straps 28a, 28b may be secured to the rigid member 12. The tensioners may be secured inboard of the end portions 14a, 14b, such that the end portions even extend beyond the edges of the hood if the rigid member 12 is long enough, whereas the hooks 20a, 20b can then be cinched inboard of the end portions. The tensioner may be any strap tensioner known in the art, such as a ratchet tensioner, buckle, cambuckle, or any such apparatus. As known in the art, many of such tensioners have at least two modes of operation, one in which movement in one direction is allowed and movement in the opposite direction is hindered or prevented and another in which the strap is allowed to move in either direction. Accordingly, the tensioners 26a, 26b enable pulling of the straps 28a, 28b in order to tension the straps 28a, 28b and secure the rigid member 12 to the hood of an automobile using the hooks 20a, 20b. The tensioners 26a, 26b may also be released in order to allow removal of the hooks 20a, 20b and rigid member 12.

Various other flexible means of attachment may be used to secure the hooks 20a, 20b to the rigid member 12. For example, an elastic members may secure the hooks 20a, 20b to the rigid member 12. In this manner, the compliance of the elastic members is operable to provide a degree of adjustability and also provide a tensioning restoring force to engage the hooks 20a, 20b with the hood of an automobile.

The rigid member 12 may provide a platform for the temporary holding or retaining of tools close at hand when working on an automobile. Accordingly, one or more temporary tool retaining structures 30a-30c may secured to the rigid member. For example, a socket rack 30a may be fastened to the rigid member 12 by means of screws, bolts, welds, or any other fastening means. Likewise a hook 30b or magnetic strip 30c may secure to the rigid member 12 by any one of such fastening means. Various tools such as sockets 32a, wrenches 32b, screw drivers 32c, or any other tool may engage the tool retaining structures 30a, 30c to retain the tool temporarily when not in actual use. As will be discussed in greater detail below, one or more clamps 32d may secured to the rigid member 12. A clamp 32d may be of use as a tool and may also be used to secure other tools to the rigid member 12.

The flexible securement of the hooks 20a, 20b to the rigid member 12 may advantageously enable securement to hoods of various sizes and also make the tool holding system 10 easier to set up and store. However, the flexibility of the securement of hooks 20a, 20b to the rigid member 12 may also permit rotation in rotational direction 18a, which may be unacceptable. In such embodiments, a stabilizer 34 may be used to resist such rotation. The stabilizer may include a first portion 36a that engages or includes a fastener 38 for securing to a hood of an automobile. The stabilizer 34 may also include a second portion 36b that temporarily or permanently secures to the rigid member 12. The extent of the stabilizer between the first and second portions may be effective to substantially hinder rotation of the rigid member 12 in rotational direction 18a.

Figure 1B:
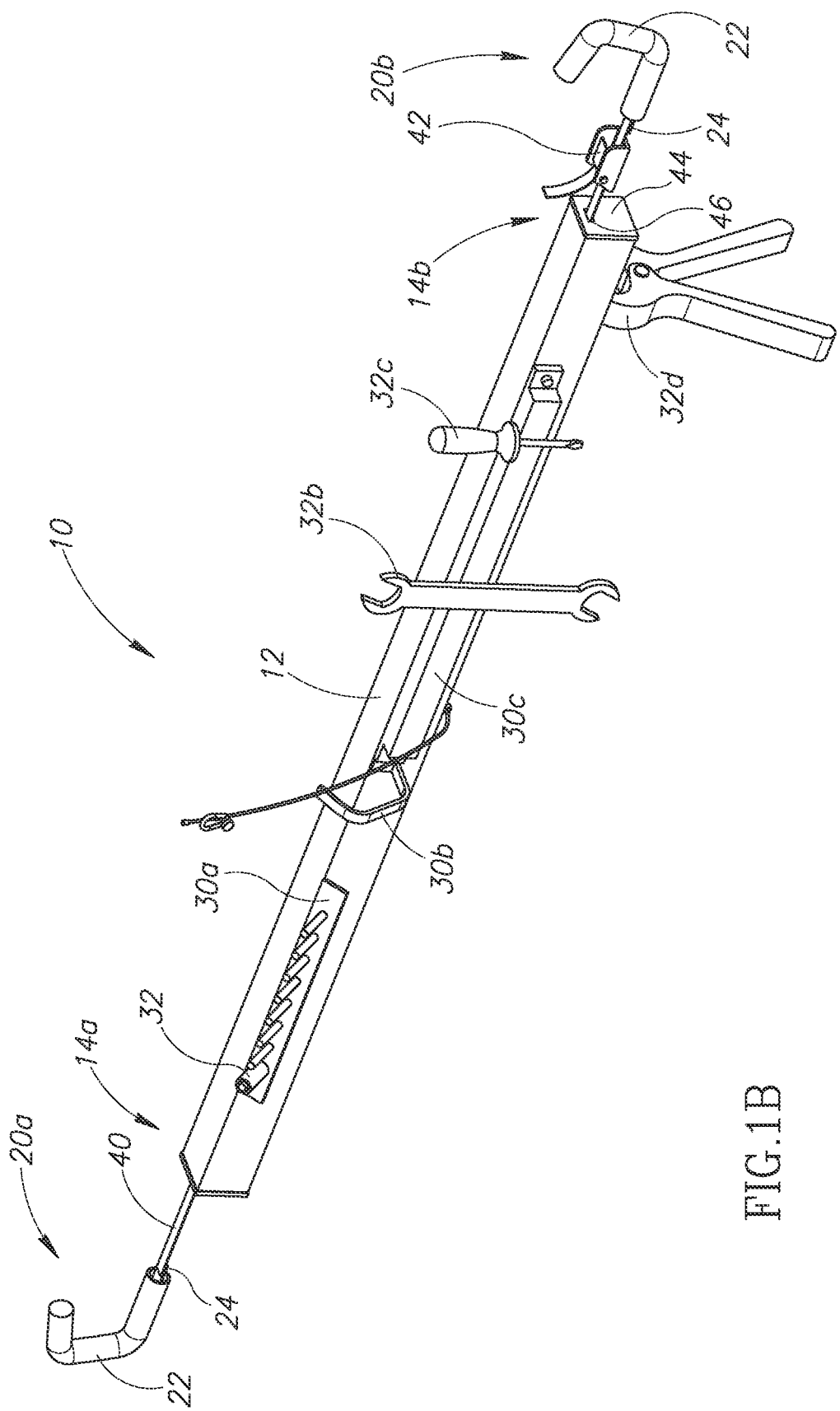
FIG. 1B is an isometric view of an alternative embodiment of a tool holding system in accordance with an embodiment of the present invention.

Referring to FIG. 1B, as noted above, various flexible means of attachment may be used to secured the hooks 20a, 20b to the rigid member 12. In the illustrated alternative embodiment, a single strap 40 extends through the rigid member 12. One end of the strap may secure to a hook 20a while the other end of the strap engages a tensioner 46 secured to the other hook 20b. In such embodiments, the rigid member 12 may define an end cap 44 or end member 44 at either end thereof and defining a slit 46. The slit 46 permits threading of the strap 40 therethrough and the engagement of the slit 46 with the strap resists rotation of the rigid member. As for the embodiment of FIG. 1A, the strap 40 may be elastic such that a restoring force of the strap 40 applies tension to the hooks 20a, 20b such that the tensioner 42 is omitted. In some embodiments, both an elastic strap 40 and a tensioner 42 are used.

Figure 2:
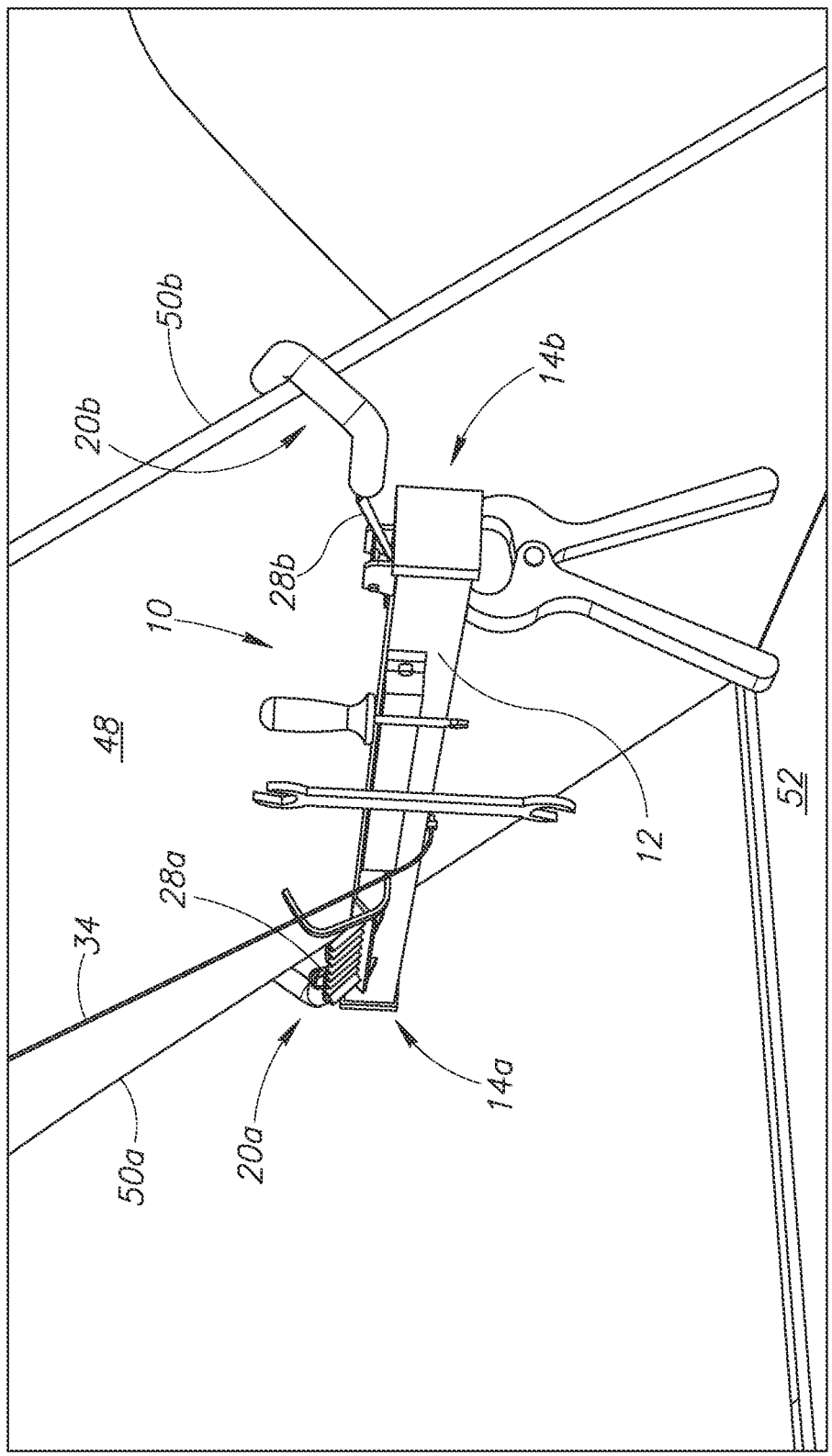
FIG. 2 is a perspective view of a tool holding system installed under the hood of an automobile in accordance with an embodiment of the present invention.

FIG. 2 illustrates a tool holding system 10 in use. As is apparent in FIG. 2, the tool holding system 10 is securable under the hood 48 of a car, the system positioned over the engine compartment 52 thereof. The hooks 20a, 20b receive the edges 50a, 50b of the hood 48. The tension in the straps 28a, 28b urges the hooks 20a, 20b against the edges 50a, 50b and friction between the edges 50a, 50b and the hooks 20a, 20b may then retain the rigid member 12 at a desired position under the hood 48.

In use, a user may install the tool holding system 10 by positioning one edge 50a of the hood 48 in a hook 20a. The user may then apply tension to the rigid member 12 to urge the edge 50a against the hook 20a to retain the hook 20a against the edge 50a. The user may then engage the hook 20b with the opposite edge 20b and apply tension to one or both of the tensioners 26a, 26b until there is sufficient tension to retain the hooks 20a, 20b in engagement with the edges 50a, 50b, respectively.

In yet another alternative method of installation, the rigid member may be positioned at the base of the hood 48, the hooks 20a, 20b placed in engagement with the edges 50a, 50b, and the straps 28a, 28 are tensioned sufficiently to retain the hooks 20a, 20b in engagement with the edges 50a, 50b. In this method, the user is relieved of the need to support the rigid member 12 and apply tension to one of the hooks 20a, 20b during installation of an opposite hook 20a, 20b since the rigid member 12 can be rested in the engine compartment. The hooks 20a, 20b can then be incrementally slid up the edges 50a and the straps 28a, 28b incrementally tensioned until the rigid member 12 is positioned and retained at a desired location under the hood 48.

Figure 3:
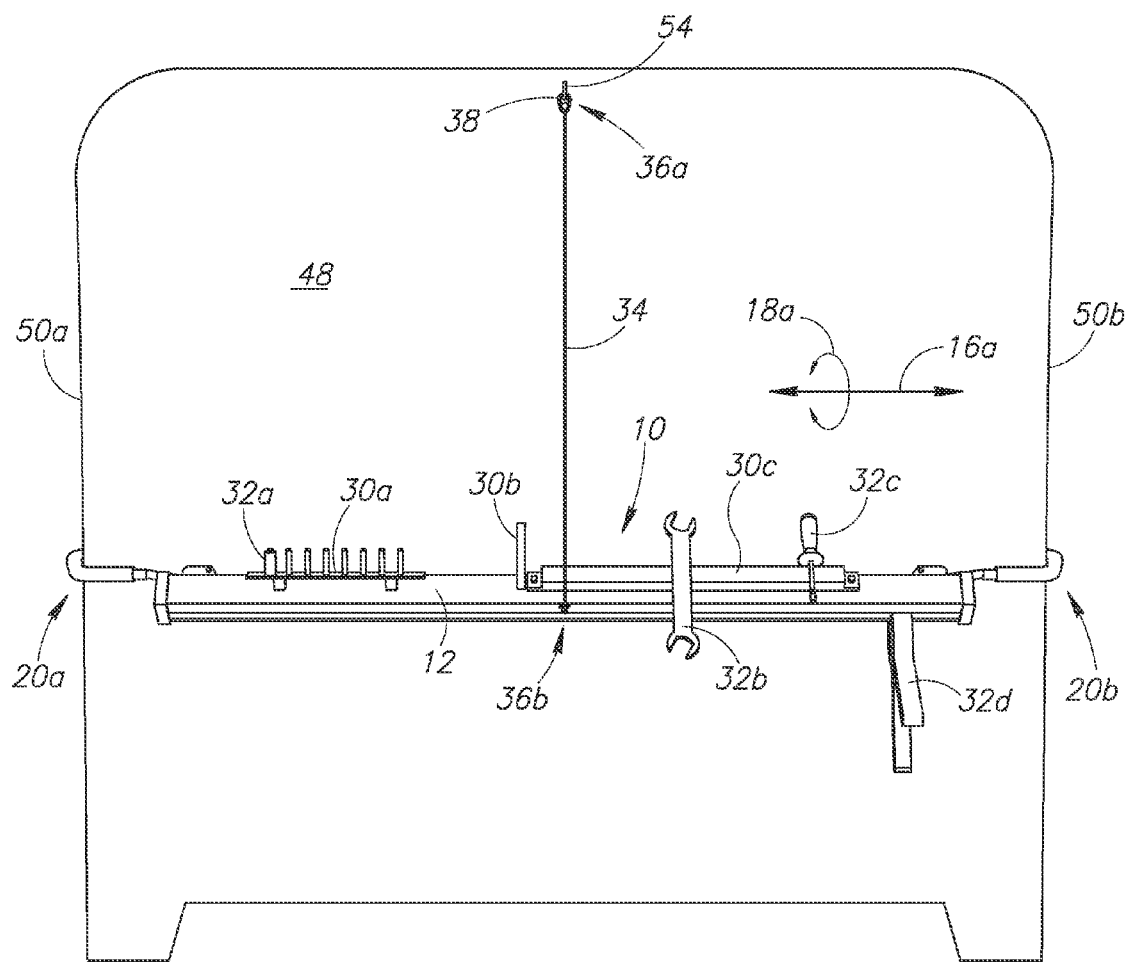
FIG. 3 is a front elevation view of an automobile hood having a tool holding system installed thereon in accordance with an embodiment of the present invention.

FIG. 3, at some point in the installation process, such as before or after the method described above with respect to FIG. 2, the stabilizer 34 may be secured to some portion of the automobile, such as to the hood 48. For example, in the illustrated embodiment, the fastener 38 secured to the stabilizer 34 engages the striker 54 of the automobile hood 48. For example, the fastener 38 may be embodied as a karabiner or other slip or hook that engages the striker 54. The fastener 38 may also engage any of the various exposed edges and apertures defined on the underside of a hood 48 in other methods of operation.

In this manner the stabilizer resists rotation of the rigid member 12 in rotational direction 18a. In the illustrated embodiment, the portion 36b of the stabilizer 34 attaches to the rigid member 12 such that when installed under the hood 48 of a car, at least a portion of the rigid member 12 is positioned between the stabilizer 34 and the hood 48. In this manner, tension in the stabilizer 34 opposes the tendency of gravity operating on the tool retaining structures 30a-30c and tools 32a-32d to rotate the rigid member 12.

Figure 4:
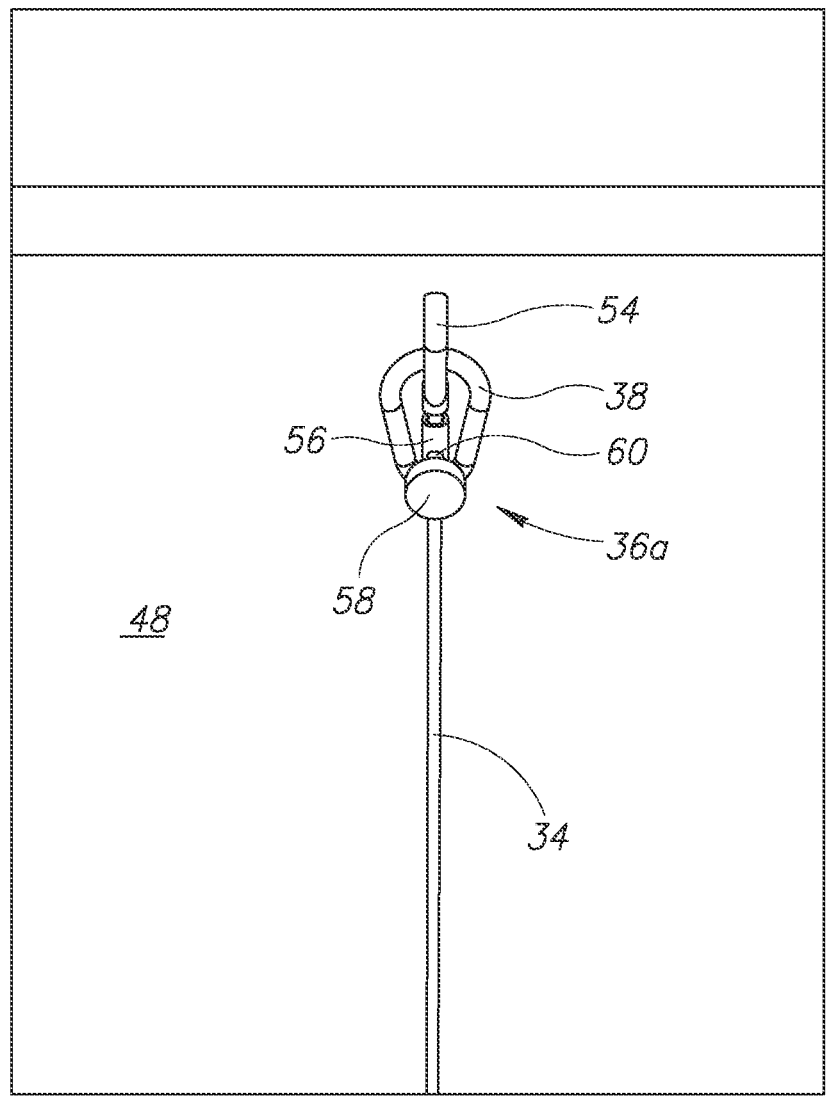
FIG. 4 is a front elevation view of a stabilizer for a tool holding system in accordance with an embodiment of the present invention.

FIG. 4 illustrates an example of a method for securing a stabilizer 34 to the hood 48 of an automobile. In the illustrated embodiment, the striker 54 engages a fastener 38 embodied as a karabiner, hook, or some other clip or linkage. The illustrated embodiment also shows a sleeve 56 engaging the stabilizer 34 that is embodied as a cable or other flexible or rigid rod. In the illustrated embodiment, a knob 58 is affixed to a set screw 60. The set screw 60 is threaded into the sleeve 56 and is engaged and disengaged with the stabilizer 34 by rotation of the knob 58. In this manner, an extent of the stabilizer between the fastener 38 and the rigid member 12 may be adjusted. This enables the tool holding system 10 to accommodate different securement locations available on a hood 48 and different sizes of hoods 48. The fastener 38 may engage the set screw 60 between the knob 58 and sleeve 56, a loop of material secured to the sleeve 56, or an aperture defined by the sleeve 56 or a structure secured to the sleeve 56. In some embodiments, a fastener 38 may be rigidly secured to the sleeve or be monolithically formed with the sleeve 56.

Figure 5:
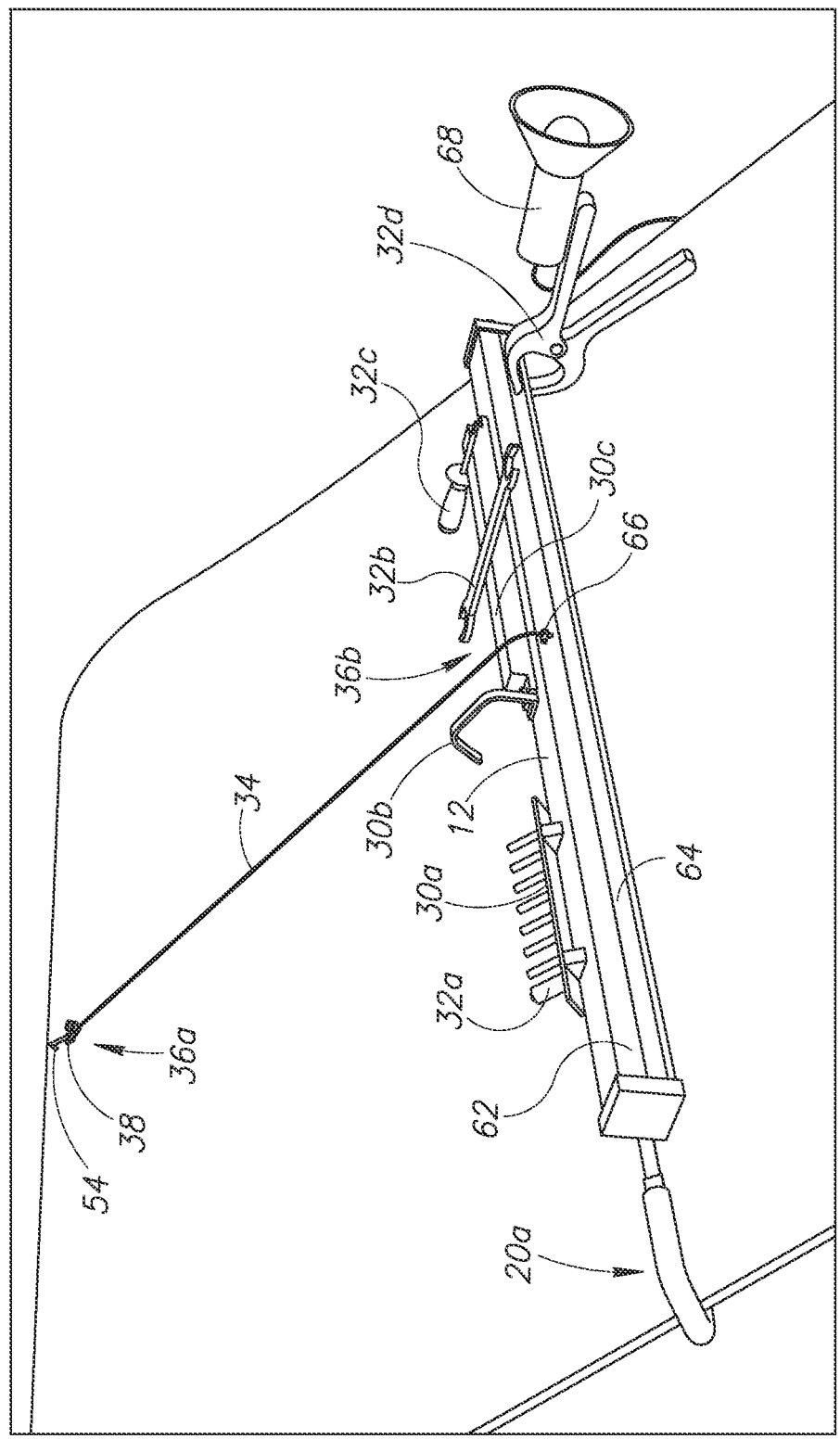
FIG. 5 is a lower isometric view of a tool holding system secured to an automobile hood in accordance with an embodiment of the present invention.

Referring to FIG. 5, In an alternative embodiment, the position on the stabilizer 34 at which the fastener 38 engages the stabilizer 34 may be fixed whereas the point at which the rigid member 12 secures to the stabilizer 34 may be varied. For example, a sleeve or aperture secured to the rigid member 12 may engage the stabilizer 34 and a set screw or other fastener may selectively retain the stabilizer within the sleeve or aperture or selectively secure to the stabilizer 34 at an adjustable location and prevent movement through the sleeve or aperture beyond a certain point. Any other method of securement of the stabilizer 34 to the rigid member in a fixed or adjustable manner may also be used. For example, the stabilizer 34 may be embodied as a strap with a buckle enabling adjustment in length as known in the art.

A lower surface 62 of the rigid member 12 may define a groove 64 or channel 64. As also shown in FIG. 5, a fastener 66 securing the portion 36b of the stabilizer 34 to the rigid member in a permanent or adjustable manner may secure to the lower surface 62 or some other surface of the rigid member 12. As shown in FIG. 5, the fastener 66 is located at the center of the rigid member 12, however other positions along the rigid member 12 may be used. As already noted, the fastener 66 may secure at variable locations along the stabilizer 34 in order to adjust the length of the stabilizer 34.

The groove 64 may define an opening through to a hollow center of the rigid member 12. The groove 64 may receive any sort of structure such as hooks or other structure slidably of fixedly mounted therein. The hooks or other structure may then hold a tool or other item involved in car repair. In the illustrated embodiment, the groove 64 may also engage a clamp 32d that may serve to secure a tool or some other item to the rigid member 12. In the illustrated embodiment, the clamp 32 has a light 68 secured thereto for illuminating the engine compartment.

While the preferred embodiments of the invention have been illustrated and described, as noted above, many changes can be made without departing from the spirit and scope of the invention. Accordingly, the scope of the invention is not limited by the disclosure of the preferred embodiments. Instead, the invention should be determined entirely by reference to the claims that follow.

The embodiments of the invention in which an exclusive property or privilege is claimed are defined as follows:

1. An apparatus for securement to a hood of an automobile, the apparatus comprising:
   a rigid portion sized to span a major portion of the hood along at least one direction;
   a first hook flexibly secured to a first end portion of the rigid portion and positioned to receive a first edge of the hood;
   a second hook flexibly secured to a second end portion of the rigid portion, the second end portion being opposite the first end portion, the second hook positioned to receive a second edge of the hood such that a portion of the hood is captured between the first and second hooks;
   at least one temporary tool retaining member mounted to the rigid portion, and
   a stabilizer having a first portion engaging the rigid member and a second portion engaging a fastener for selectively securing the stabilizer to the hood.

2. The apparatus of claim 1, wherein the first and second hooks have a compliant outer covering.

3. The apparatus of claim 1, wherein the rigid member comprises a hollow rod.

4. The apparatus of claim 1, wherein the rigid member defines a groove extending along a substantial portion of the length thereof between the first and second ends.

5. The apparatus of claim 1, further comprising at least one strap securing the first and second hooks to the rigid member.

6. The apparatus of claim 5, further comprising at least one tensioning member secured to the rigid member proximate at least one of the first and second ends portions, the tensioning member selectively permitting tensioning movement of the strap and loosening of the strap.

7. The apparatus of claim 1, further comprising
   first and second straps secured to the first and second hooks, respectively; and
   first and second tensioning members secured to the rigid member at the first and second end portions, respectively, the first and second tensioning members having a locked position permitting tensioning and hindering release of the first and second straps and a released position permitting release of the first and second straps.

8. The apparatus of claim 1, wherein the stabilizer is a flexible member.

9. The apparatus of claim 1, wherein an extent of the stabilizer between the rigid member and the fastener is adjustable.

10. The apparatus of claim 1, wherein the at least one temporary tool retaining member is a socket rack.

11. The apparatus of claim 1, wherein the at least one temporary tool retaining member is a magnetic bar.

12. The apparatus of claim 1, wherein the at least one tool retaining member is at least one hook.

\* \* \* \* \*